J. A. & W. A. BREWER.
RAKE CLEANER.
APPLICATION FILED JULY 16, 1913.
1,136,770.
Patented Apr. 20, 1915.
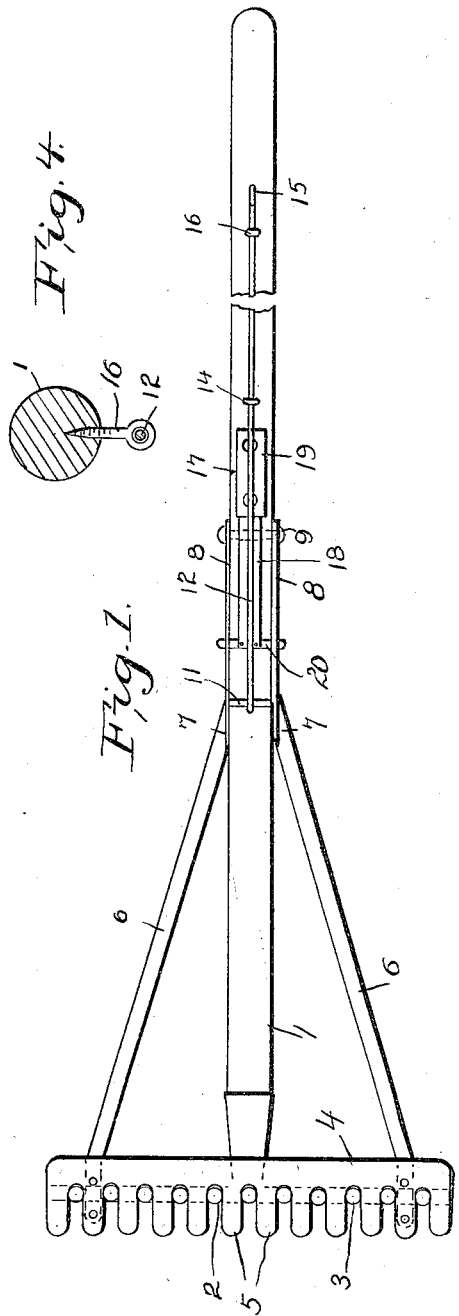
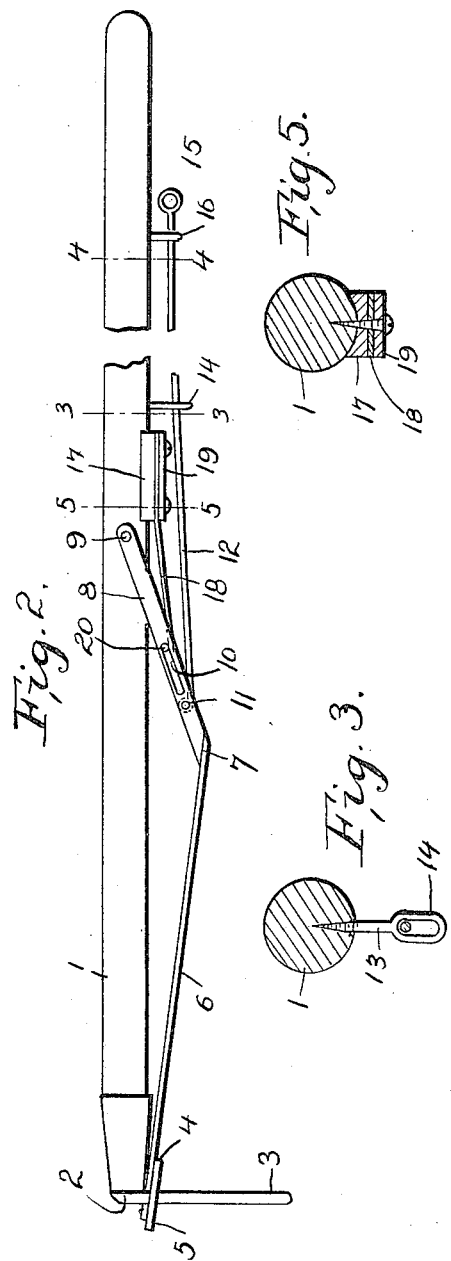
Witnesses
R. N. Jones
H. Faye Martin
Inventors
Joseph A. Brewer
Walker A. Brewer
By A. Randolph Jr.
Attorney

UNITED STATES PATENT OFFICE.

JOSEPH A. BREWER, OF WASHINGTON, DISTRICT OF COLUMBIA, AND WALKER A. BREWER, OF LONG ISLAND CITY, NEW YORK.

RAKE-CLEANER.

1,136,770.

Specification of Letters Patent.

Patented Apr. 20, 1915.

Application filed July 16, 1913. Serial No. 779,359.

*To all whom it may concern:*

Be it known that we, JOSEPH A. BREWER and WALKER A. BREWER, citizens of the United States, residing at Washington and Long Island City, respectively, in the District of Columbia and in the county of Queens, State of New York, respectively, have invented certain new and useful Improvements in Rake-Cleaners; and we do hereby declare the following to be a full, clear, and exact description of the invention, such as will enable others skilled in the art to which it appertains to make and use the same.

This invention relates to new and useful improvements in rake cleaners and has for its object the provision of a device of the above character which may be easily and quickly applied to a rake of the ordinary type without materially changing the construction of the same.

Another object of our invention is the provision of a device of the above character which may be easily and quickly operated from the handle of the rake thereby eliminating the necessity of the operator using his hands to strip the teeth of trash which may have gathered thereon.

A still further object of our invention is the provision of a device of the above character which will automatically return to its normal position and thereby eliminate the necessity of manually returning the same.

With the above and other objects in view we now proceed to describe our invention in the following specification, and accompanying drawings, in which, Figure 1 is a bottom plan view of our improved rake cleaner showing the same as it would appear when applied to a rake, Fig. 2 is a side view in elevation of Fig. 1, Fig. 3 is a transverse sectional view taken on line 3—3 of Fig. 2, Fig. 4 is a transverse sectional view of our improved rake cleaner taken on line 4—4 of Fig. 2, and Fig. 5 is a transverse sectional view taken on line 5—5 of Fig. 2.

Referring to the drawings by characters of reference 1 indicates the handle of a rake, 2 indicates the head which is secured to the end thereof and carries the usual teeth 3.

Our improved cleaner attachment preferably comprises the stripping bar 4 which is preferably formed of a single sheet of material and has extending outwardly therefrom the stripping fingers 5 which are formed integral with said stripping bar and are adapted to lie intermediate the teeth secured to the rake head when the device is in place. These stripping fingers 5 are formed by cutting a plurality of slots in the sheet metal which forms the stripping bar at predetermined intervals which will be clearly seen upon referring to Fig. 1 of the drawing. Secured to the upper surface of said stripping bar and immediately adjacent each end we preferably provide the arms 6 which extend rearwardly and inwardly toward the center of the bar for considerable distance and are twisted, as clearly illustrated at 7, to form the parallel arms 8 which are pivotally connected to the handle, as clearly shown at 9, and are provided intermediate their ends with the longitudinally extending slots 10, the use of which will be more fully hereinafter described. Adjacent the lower extremity of the parallel arm members 8 and extending transversely thereof we preferably provide the bar 11 which is adapted to form a brace rod for said arms and retain the same in their parallel relation and act as a connection for the operating mechanism.

The operating mechanism for our improved rake cleaning device preferably comprises a suitable longitudinally extending rod 12 which is pivotally secured to the bar 11, previously described, and extends toward the handle of the rake. This rod 12 is slidably mounted in a screw-eye 13, the loop of which is elongated as clearly shown at 14, thereby providing a guide to prevent displacement of said bar. The bar terminates at its rearmost extremity in a suitable knob or finger hold 15 and is secured in place at suitable intervals along the handle of the rake by suitable screw-eyes 16 through which the said bar is adapted to slide when the device is in use. A suitable block 17 is secured to the under side of the rake handle, as clearly illustrated at Fig. 2 and carries on its lower face the leaf spring 18 which is clamped firmly between the under surface of the block and a suitable clamping block 19. Each of the blocks and the spring is provided with suitable apertures through which screws or other fastening means are adapted to extend which hold the device in position. At the end of the spring opposite the blocks 17 and 19 we preferably provide the transversely extending bar 20 which is slidably mounted in the slots 10 as will be clearly seen upon referring to the drawings and is adapted to form a connecting means between the spring and the arms 8.

When it is desired to make use of our improved device an aperture is drilled through the rake handle at the desired point. The block 17 is then put in position, and the arms 8 pivotally secured to a suitable pivot, which extends through the aperture, previously described. The spring 18 is then placed in operative relation with the bars and block and the operating rod 12 secured to the transversely extending bar 11, which is provided for that purpose. This rod 12 is slidably secured to the handle by means of the screw eyes, previously described and it will be clearly seen that the device in its assembled position will be in condition for use. When it is desired to strip the teeth of any trash which may have gathered thereon it will be obvious that by pulling the rod 12 the stripping bar 4 will be caused to descend toward the ends of the teeth and force the trash therefrom.

While in the foregoing we have shown and described the preferred embodiment of our invention, we wish it to be understood that we may change the specific arrangement of parts without in any way departing from the spirit and scope of our invention.

What we claim is:—

In combination with a rake, a stripping bar having a plurality of extensions on one side thereof, said extensions being spaced from each other and adapted to extend in the spaces between the rake teeth, a pair of extensions secured to the stripping bar adjacent the ends and projecting in an opposite direction to the first mentioned extensions, each of the second mentioned extensions being bent and converging toward their free ends, parallel projections formed integral with the converging members and extending angularly with relation thereto, the free ends of said parallel extensions being pivotally secured to the rake handle, each of said parallel projections being provided with a slot intermediate its ends, a leaf spring secured to the rake handle and extending forwardly between the parallel projections, a transverse bar secured to the free end of the leaf spring and extending through the slot in the projections and an operating rod pivotally secured to the extensions near the end where they join the angle members and slidably mounted on the rake handle to provide a means to operate the stripping bar.

In testimony whereof we affix our signatures in presence of witnesses.

JOSEPH A. BREWER.
WALKER A. BREWER.

Witnesses:
WILLIAM L. RUFFIN,
JUAN G. BRANDBERG,
EDWARD EATON,
WALLACE J. TRASK.

Copies of this patent may be obtained for five cents each, by addressing the "Commissioner of Patents, Washington, D. C."